US011485096B2

(12) United States Patent
Shewchuk et al.

(10) Patent No.: US 11,485,096 B2
(45) Date of Patent: Nov. 1, 2022

(54) METHOD AND SYSTEM FOR MANUFACTURING COMPOSITE STRUCTURES USING A MAGNESIUM BLADDER

(71) Applicant: The Boeing Company, Chicago, IL (US)

(72) Inventors: Steven M. Shewchuk, Saint Louis, MO (US); Justin Joseph Schell, Saint Peters, MO (US); Michael Palmore Matlack, Saint Charles, MO (US); Ravi Verma, Chesterfield, MO (US)

(73) Assignee: The Boeing Company, Chicago, IL (US)

( * ) Notice: Subject to any disclaimer, the term of this patent is extended or adjusted under 35 U.S.C. 154(b) by 248 days.

(21) Appl. No.: 16/415,985

(22) Filed: May 17, 2019

(65) Prior Publication Data

US 2020/0361162 A1    Nov. 19, 2020

(51) Int. Cl.
*B29C 70/34*     (2006.01)
*B29K 701/12*    (2006.01)
*B29L 31/30*     (2006.01)

(52) U.S. Cl.
CPC ........ *B29C 70/342* (2013.01); *B29K 2701/12* (2013.01); *B29L 2031/3076* (2013.01)

(58) Field of Classification Search
None
See application file for complete search history.

(56) References Cited

U.S. PATENT DOCUMENTS

| 2009/0057947 A1* | 3/2009 | Nemchick | ............... B29C 70/46 264/258 |
| 2010/0170613 A1* | 7/2010 | Kendall | ............ B29C 66/91631 156/60 |

(Continued)

FOREIGN PATENT DOCUMENTS

| EP | 0410599 A2 | 1/1991 |
| GB | 2139934 A | 11/1984 |

(Continued)

OTHER PUBLICATIONS

B.R. Vidyashankar, Analysis of laminates with ply drops, (2001), Elsever, Composites Science and Technology 61 749-758 (Year: 2001).*

(Continued)

*Primary Examiner* — Philip C Tucker
*Assistant Examiner* — Evan T Hulting
(74) *Attorney, Agent, or Firm* — Yee & Associates, P.C.

(57) ABSTRACT

A composite manufacturing system and method are provided. The composite manufacturing system comprises a press and a bladder. The press has an upper portion having a desired shape for a composite structure and a lower portion configured to receive layers of composite material. The bladder is associated with the upper portion of the press and is configured to reach a superplastic state when heated such that the bladder forms to the composite structure by applying heat and pressure to the layers of composite material. The bladder cools without appreciable shrinkage, applying a desired amount of pressure to the composite structure during the entire cooling cycle. Once one composite structure is formed using the bladder, the bladder may be reused to form similar structures.

20 Claims, 10 Drawing Sheets

(56) References Cited

U.S. PATENT DOCUMENTS

| | | | |
|---|---|---|---|
| 2015/0017362 A1* | 1/2015 | Matsen | B29C 35/0805 |
| | | | 428/35.8 |
| 2018/0036967 A1* | 2/2018 | Deck | B29C 70/44 |
| 2018/0250915 A1* | 9/2018 | Wu | B32B 27/308 |
| 2019/0184610 A1* | 6/2019 | Matsen | B29C 35/0805 |

FOREIGN PATENT DOCUMENTS

| | | |
|---|---|---|
| JP | 04043010 A | 2/1992 |
| WO | 201707869 A1 | 5/2017 |

OTHER PUBLICATIONS

Extended European Search Report, dated Aug. 24, 2020, regarding Application No. 20151458.5, 8 pages.

\* cited by examiner

METHOD AND SYSTEM FOR MANUFACTURING COMPOSITE STRUCTURES USING A MAGNESIUM BLADDER

GOVERNMENT LICENSING RIGHTS

This invention was made with government support under contract W911-NF-16-2-0087 awarded by the United States Army Research Office and the Defense Advanced Research Projects Agency (DARPA). The government has certain rights to this invention.

BACKGROUND INFORMATION

1. Field

The present disclosure relates generally to manufacturing composite structures. More specifically, the present disclosure relates to a method and system for manufacturing composite structures for aircraft applications using a magnesium bladder.

2. Background

Manufacturers increasingly use composite structures to provide light-weight and structurally sound parts for various applications. Some of these composite structures are manufactured using compression molding presses. Most press systems use matched metal tooling with tight manufacturing tolerances. With such techniques, composite material is placed over a male tool on the lower platen of the press and the upper platen, with a female tool, applies pressure and heat to form the composite structure. This matched metal tooling may be difficult to maneuver and/or more expensive to procure than desired.

When using matched metal tooling, the press system is typically configured to make a single part geometry or, alternatively, to provide slight variations of geometry with the introduction of tool inserts.

Fabricating composite structures using press methods takes hours to complete each cycle. If the final structure is fabricated with inconsistencies, or is outside selected tolerances, it may need rework, resulting in further delay.

Therefore, it would be desirable to have a method and apparatus that takes into account at least some of the issues discussed above, as well as other possible issues.

SUMMARY

An illustrative embodiment of the present disclosure provides a composite manufacturing system comprising a press and a bladder. The press comprises an upper portion and a lower portion. The lower portion has a desired shape for a composite structure and is configured to receive layers of composite material. The bladder is associated with the upper portion of the press and configured to reach a superplastic state when heated such that the bladder forms to the composite structure by applying pressure to the layers of composite material.

Another illustrative embodiment of the present disclosure provides a method for forming a composite structure. Layers of composite material are positioned in a lower portion of a press having a desired shape for the composite structure. A bladder associated with an upper portion of the press is placed over the layers of composite material. The press is closed. A space between the upper portion of the press and the bladder is pressurized to a first level of pressure. The bladder is heated to a superplastic state such that the bladder forms to the composite structure. The space is then pressurized to a second level of pressure greater than the first level of pressure to form the composite structure. The bladder directly contacts the layers of composite material, thus transferring heat and pressure to the layers of composite material throughout the cycle.

A further illustrative embodiment of the present disclosure provides a method for consolidating and forming a composite structure for an aircraft. Layers of thermoplastic material are positioned in a lower portion of a press having a desired shape for the composite structure. A bladder associated with an upper portion of the press is placed over the thermoplastic material. The press is closed. The space between the upper portion of the press and the bladder is pressurized to a first level of pressure. The bladder is heated to a superplastic state such that the bladder forms to the composite structure. The space is then pressurized to a second level of pressure greater than the first level of pressure to consolidate and form the composite structure using only one process.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current manufacturing processes for composite structures takes more time than desired. When using a press with matched metal tooling, manufacturing cycles may take eight or more hours to complete. Such tooling has long lead times, sometimes several weeks, and typically needs rework after the tooling arrives.

Matched metal tooling lacks the versatility desired by aircraft manufacturers. Male and female tools are specific to part design and are configured to form a single part geometry with tight tolerances. In some cases, slight geometric variations are available with inserts; however, if a completely different part geometry is needed, both the male and female tools must be changed. With matched metal tooling, additional pressure is needed to maintain the integrity of the composite during the cooling phase, as the metal shrinks from its heated state to its cooled state.

The illustrative embodiments also recognize and take into account that when forming fiber-reinforced thermoplastics, some currently used solutions employ single-sided tooling with traditional autoclave processing. Such processing requires high temperature consumable materials, high pressure sensitive tapes, and a high temperature-capable autoclave for aerospace grade thermoplastic materials. These components may be more expensive or more difficult to use during processing than desired.

Thus, the disclosed embodiments provide a composite manufacturing system comprising a press and a magnesium bladder. The press has a lower portion having a desired shape for a composite structure. The lower portion is configured to receive layers of composite material. The magnesium bladder is associated with the upper portion of the press and configured to reach a superplastic state when heated such that the magnesium bladder forms to the composite structure by applying pressure to the layers of composite material. The magnesium bladder cools without substantial shrinkage away from the composite because the bladder forms over the composite structure and makes direct contact with the composite structure. During cooling, pressure in the bladder yields the bladder and transfers the pressure against the composite structure which can apply a desired amount of pressure over the entire cooling cycle. Once a composite structure is formed using the magnesium bladder, the bladder may be reused to form similar structures. When fabricating with thermoplastics, the material does not need to be consolidated prior to being placed in the press. Both consolidation and forming can be done in a single cycle. Thermal uniformity is realized over the entire surface of the part.

Figure 1:
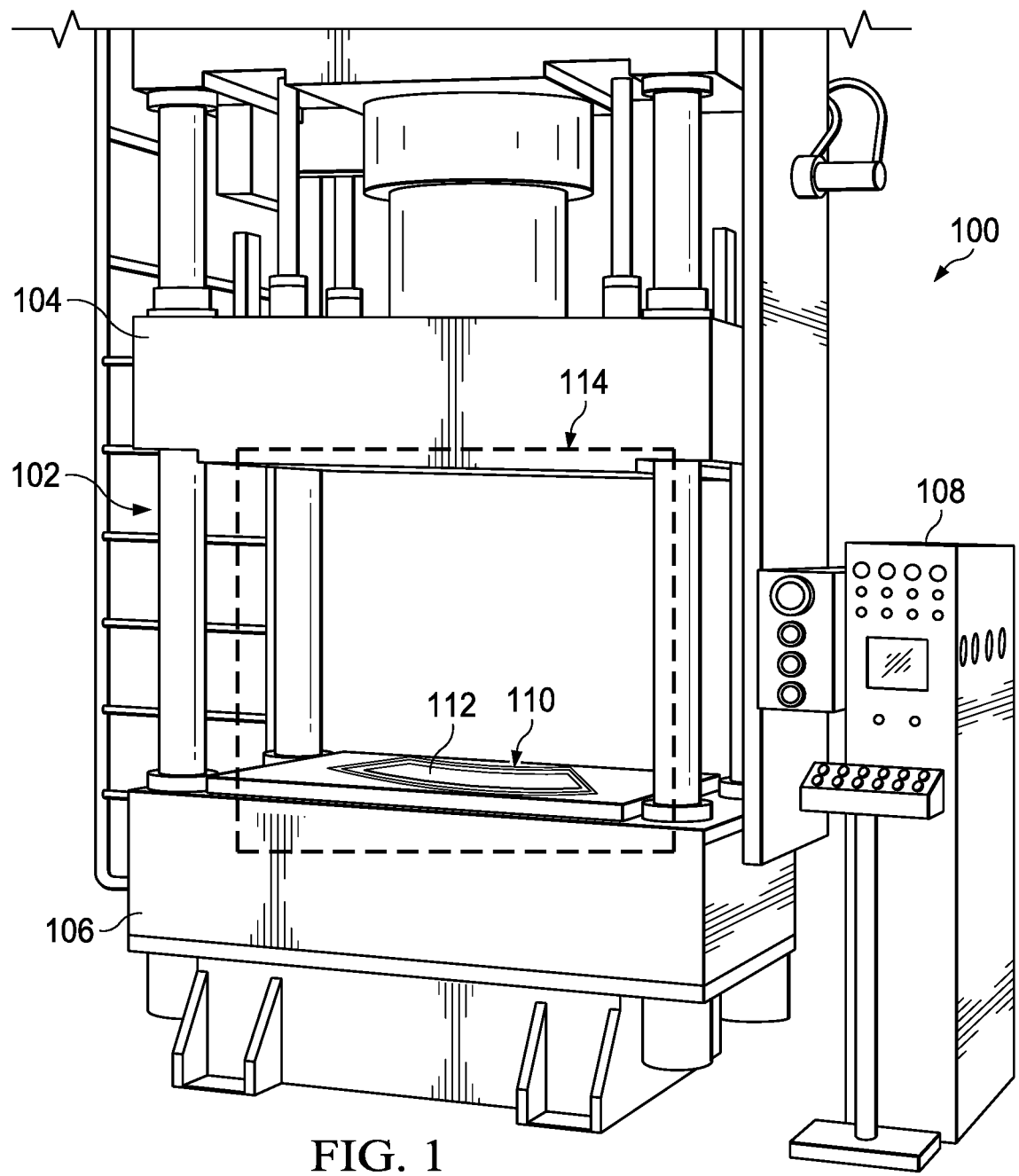
FIG. 1 is an illustration of a perspective view of a composite manufacturing system in accordance with an illustrative embodiment.

With reference now to the figures and, in particular, with reference to FIG. 1, an illustration of a perspective view of a composite manufacturing system is depicted in accordance with an illustrative embodiment. Composite manufacturing system 100 is a compression molding system in this illustrative example.

As depicted, composite manufacturing system 100 includes press 102 having upper portion 104, lower portion 106, and controller 108. Upper portion 104 and lower portion 106 of press 102 also maybe be referred to as platens in these illustrative examples.

A heating mechanism and gas supply system (not shown in this view) are integrated into press 102. Tool 110 is positioned on lower portion 106 of press 102. Tool 110 is a male tool that receives composite material 112. Upper portion 104 has an internal support structure holding a magnesium bladder in place, shown in detail in FIG. 4 and FIG. 5.

Composite material 112 comprises thermoplastic material in this illustrative example. When placed over tool 110 in lower portion 106 of press 102, composite material 112 is not yet consolidated. In other illustrative examples, composite material 112 may not comprise thermoplastics. The components in section 114 of press 102 are shown in greater detail in FIG. 3.

Figure 2:
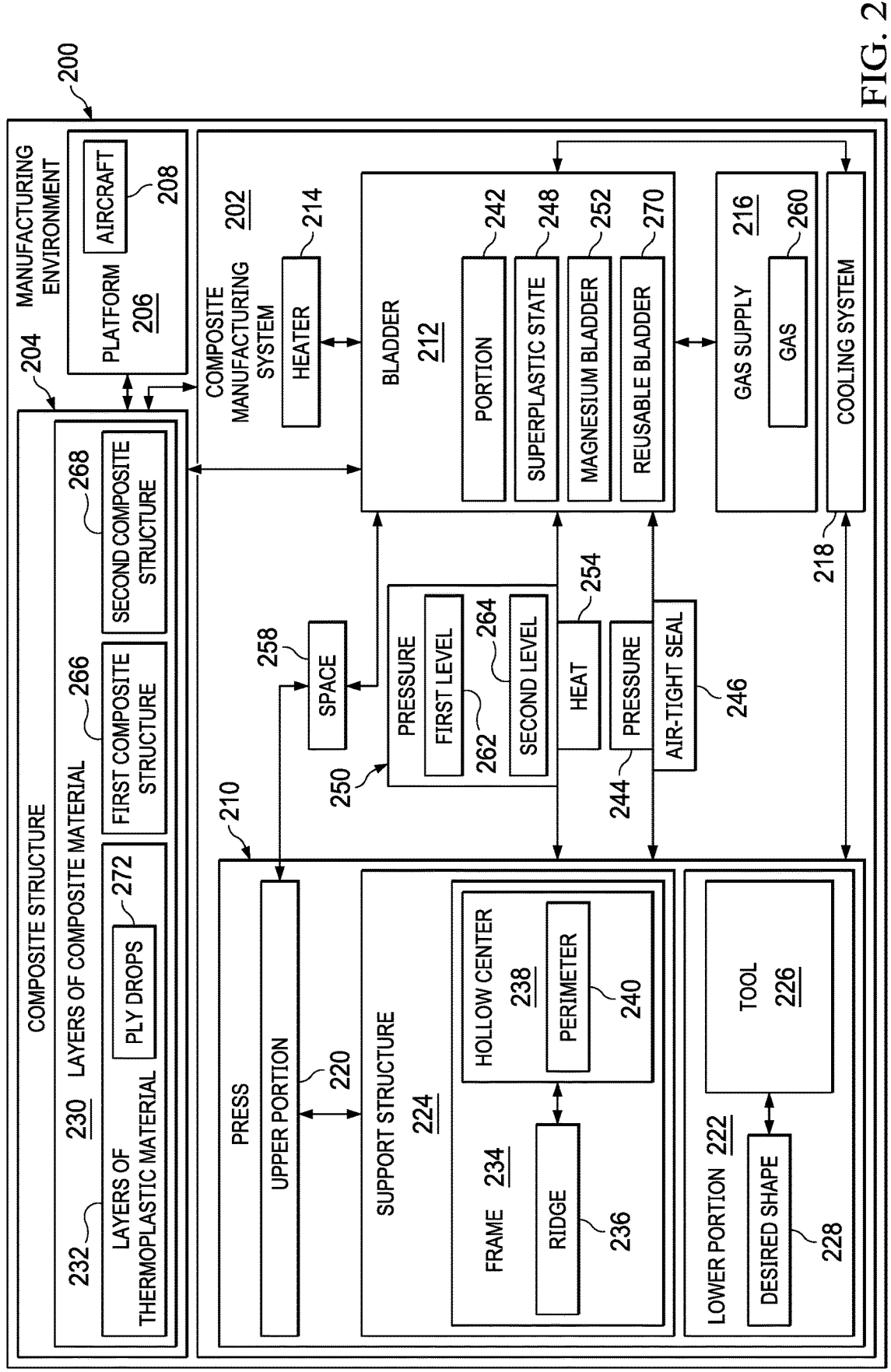
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where components within composite manufacturing system 202 may be used to fabricate composite structure 204. Composite manufacturing system 202 performs a number of processes to fabricate composite structure 204.

As used herein, "a number of" when used with reference to items means one or more items. Thus, a number of processes is one or more processes.

Composite structure 204 is a structure configured for use in platform 206. Platform 206 may be, for example, without limitation, a mobile platform, a stationary platform, a land-based structure, an aquatic-based structure, or a space-based structure. More specifically, platform 206 may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 206 takes the form of aircraft 208 in this illustrative example. When composite structure 204 is manufactured for aircraft 208, composite structure 204 may be, for example, without limitation, a stringer, a spar, a rib, a panel, a stabilizer, a skin panel, or some other suitable structure configured for use in aircraft 208.

As depicted, composite manufacturing system 202 comprises press 210, bladder 212, heater 214, gas supply 216, and cooling system 218. Press 210 takes the form of a hydraulic press in this illustrative example. Press 210 is configured to form composite structure 204 through compression molding techniques.

Press 210 comprises upper portion 220, lower portion 222, and support structure 224. Bladder 212 is associated with upper portion 220 of press 210. Tool 226 is associated with lower portion 222 of press 210 such that lower portion 222 has desired shape 228 for composite structure 204. Lower portion 222 of press 210 is configured to receive layers of composite material 230 for forming composite structure 204.

Layers of composite material 230 may comprise any type of composite material. In some cases, layers of composite material 230 may take the form of layers of thermoplastic material 232. When layers of composite material 230 take the form of layers of thermoplastic material 232, composite manufacturing system 202 is configured to consolidate and form layers of thermoplastic material 232 at substantially the same time. As a result, layers of thermoplastic material 232 do not need to be consolidated before being placed in lower portion 222 of press 210.

As illustrated, support structure 224 is connected to upper portion 220 of press 210. Support structure 224 is configured to hold bladder 212 in place during formation of composite structure 204. Support structure 224 takes the form of frame 234 in this illustrative example. Frame 234 has ridge 236 and hollow center 238. Ridge 236 runs around perimeter 240 of hollow center 238. Ridge 236 around perimeter 240 of hollow center 238 corresponds to portion 242 of bladder 212. Hollow center 238 of frame 234 allows bladder 212 to interface with layers of composite material 230 when press 210 is closed.

In this illustrative example, bladder 212 is draped over frame 234. In other words, bladder 212 may not be secured to frame 234. Frame 234 is configured to apply pressure 244 around portion 242 of bladder 212 to create air-tight seal 246 to hold bladder 212 in place. Air-tight seal 246 is a substantially air-tight seal or a near air-tight seal in this illustrative example. In other illustrative examples, bladder 212 may be removably secured to frame 234 using an adhesive, fasteners, or in some other manner.

As depicted, bladder 212 takes the form of a metal sheet. Bladder 212 comprises a metal selected from at least one of magnesium, aluminum, a magnesium alloy, an aluminum alloy, or some other suitable material. The material selected for bladder 212 is configured to reach superplastic state 248 when heated to a temperature between 600 and 800 degrees Fahrenheit. Such temperatures correspond to temperatures used when press 210 compression molds or stamps composite structure 204, which generally occurs between 698 and 797 degrees Fahrenheit. Of course, depending on the process, formation of composite structure 204 may occur at different temperatures.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Superplastic state 248 is a physical state for bladder 212 wherein bladder 212 begins to superplastically form. In other words, enough heat and pressure are applied to bladder 212 that bladder 212 begins to deform. Complete superplasticity for bladder 212 is unnecessary to enable the illustrative embodiments described herein.

In this illustrative example, bladder 212 deforms in superplastic state 248 such that bladder 212 can take desired shape 228 for composite structure 204. In other words, bladder 212 forms to composite structure 204 by applying pressure 250 to layers of composite material 230. In superplastic state 248, bladder 212 and tool 226 are configured to operate in tandem in the same manner as traditional matched metal tooling.

In this illustrative example, bladder 212 takes the form of magnesium bladder 252. For example, without limitation, magnesium bladder 252 may comprise AZ31 magnesium, a material configured to begin superplastically forming between 600 and 800 degrees Fahrenheit. Bladder 212 in superplastic state 248 is configured to not only apply pressure 250 to layers of composite material 230 but also transfers heat 254 to layers of composite material 230.

Press 210 is closed at room temperature. Space 258 exists between the surface of upper portion 220 of press 210 and bladder 212. Gas supply 216 pressurizes space 258 behind bladder 212 to ensure separation of bladder 212 from upper portion 220 of press 210 and to push bladder 212 against layers of composite material 230. Gas supply 216 may supply pressurized gas 260 of any type, including compressed air. Gas supply 216 may be any type of commercially available gas supply source.

As the process continues, gas supply 216 pressurizes space 258 to provide a desired level of pressure for forming composite structure 204 into desired shape 228. For example, gas supply 216 may pressurize space 258 to first level 262 of pressure 250 at one stage of formation of composite structure 204. In a similar fashion, gas supply 216 may pressurize space 258 to second level 264 of pressure 250 at a later stage of formation of composite structure 204. In this manner, pressure 250 can be controlled as desired.

Heater 214 is configured to heat press 210 and its components. Heater 214 may be a heat source selected from at least one of a resistive heater, heated oil, heated steam, heated compressed air, inductive heating, and other suitable types of heat sources. Heater 214 provides a level of heat 254 sufficient to form composite structure 204.

In this illustrative example, cooling system 218 is configured to cool composite structure 204 while still in press 210. Cooling system 218 may take the form of, for example, without limitation, cooling oil, ambient air, compressed air, and other suitable types of cooling systems. Bladder 212 does not substantially shrink during cooling, thus providing a desired amount of pressure 250 during the entire fabrication of composite structure 204.

Once formation of composite structure 204 is completed, composite structure 204 is removed from press 210. Bladder 212 maintains desired shape 228 for composite structure 204. As a result, bladder 212 may be used to fabricate additional structures. For instance, if first composite structure 266 is formed using bladder 212, bladder 212 may then be reused to form second composite structure 268. In such an illustrative example, bladder 212 takes the form of reusable bladder 270.

In some illustrative example, layers of composite material 230 include ply drops 272 in various locations. Because bladder 212 reaches superplastic state 248 during formation of composite structure 204, bladder 212 deforms to take into account ply drops 272 such that desired shape 228 for composite structure 204 is maintained during the entire process.

With the use of an illustrative embodiment, composite manufacturing system 202 can work efficiently. As a result, composite structure 204 may be formed more quickly and with less rework than with currently used systems.

The material used for bladder 212 is significantly less expensive that its metal tooling equivalent, reusable, and capable of applying enough heat and pressure to thermoplastics to consolidate and form in a single cycle. Thus, the illustrative embodiments reduce processing requirements, tooling procurement costs, and cycle times for thermoplastics.

Unlike hard metal tooling, bladder 212 does not appreciably shrink away from the composite during the cooling phase of the process, keeping composite structure 204 in desired shape 228. The phenomenon occurs because bladder 212 makes direct contact with composite structure 204 during superplastic state 248 of bladder 212. Once tool 226 and bladder 212 cool below superplastic forming temperatures, bladder 212 will yield from pressure 244 and fill any space between bladder 212 and composite structure 204 that may exist from thermal expansion or contraction. As a result, the illustrative embodiments provide single-sided metal tooling with a versatile, inexpensive, magnesium bladder solution that acts as a female tool and decreases the need for rework of composite structure 204.

Figure 3:
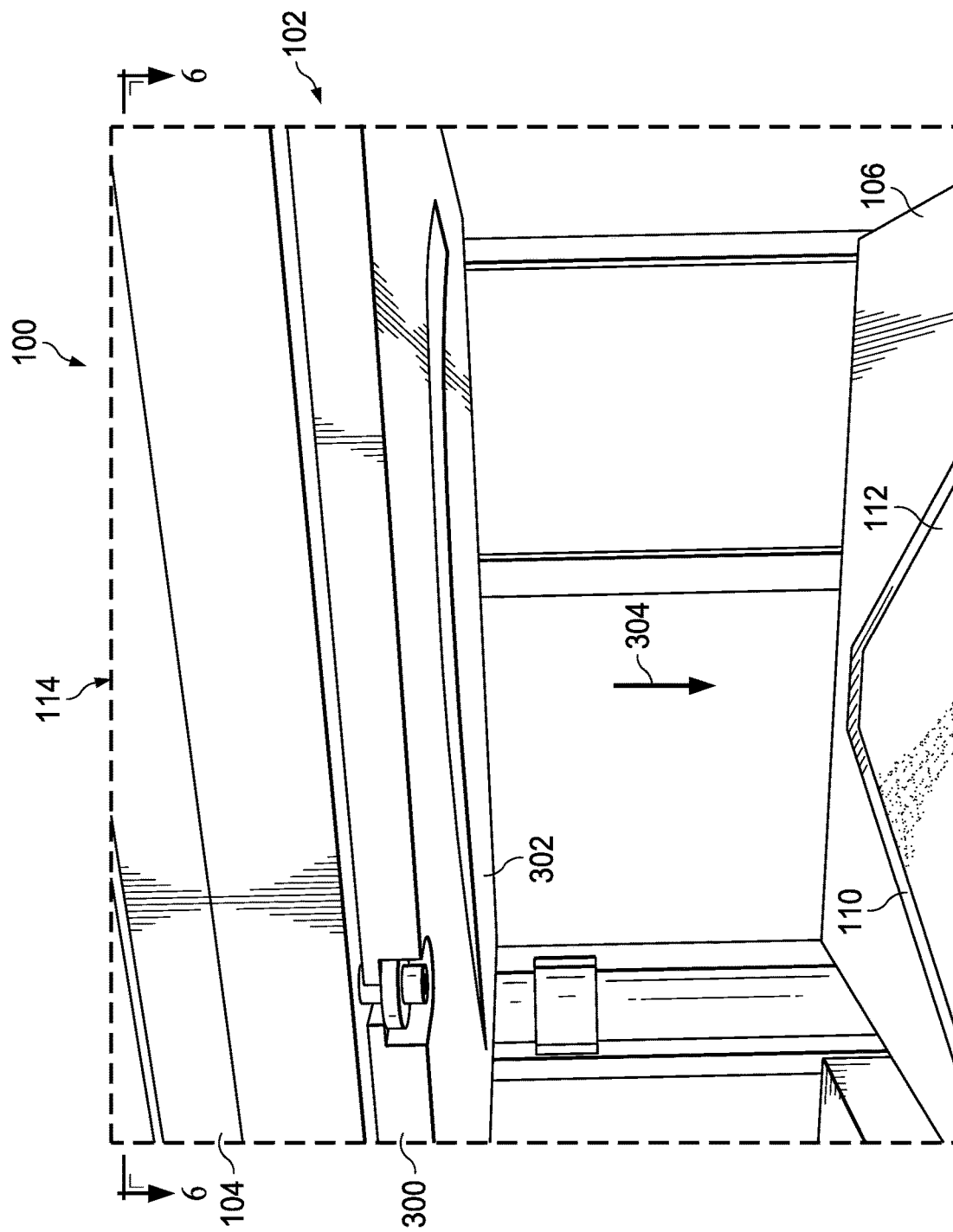
FIG. 3 is an illustration of a more-detailed view of a composite manufacturing system in accordance with an illustrative embodiment.

With reference next to FIG. 3, an illustration of a more-detailed view of a composite manufacturing system is depicted in accordance with an illustrative embodiment. A more-detailed view of press 102 from section 114 in FIG. 1 is shown. FIG. 3 illustrates an example of physical implementations of components within composite manufacturing system 202 shown in block form in FIG. 2.

As depicted, frame 300 is connected to upper portion 104 of press 102. Bladder 302 is held in place above composite material 112. Upper portion 104 of press 102 moves in the direction of arrow 304 to close and position bladder 302 on top of composite material 112.

Figure 4:
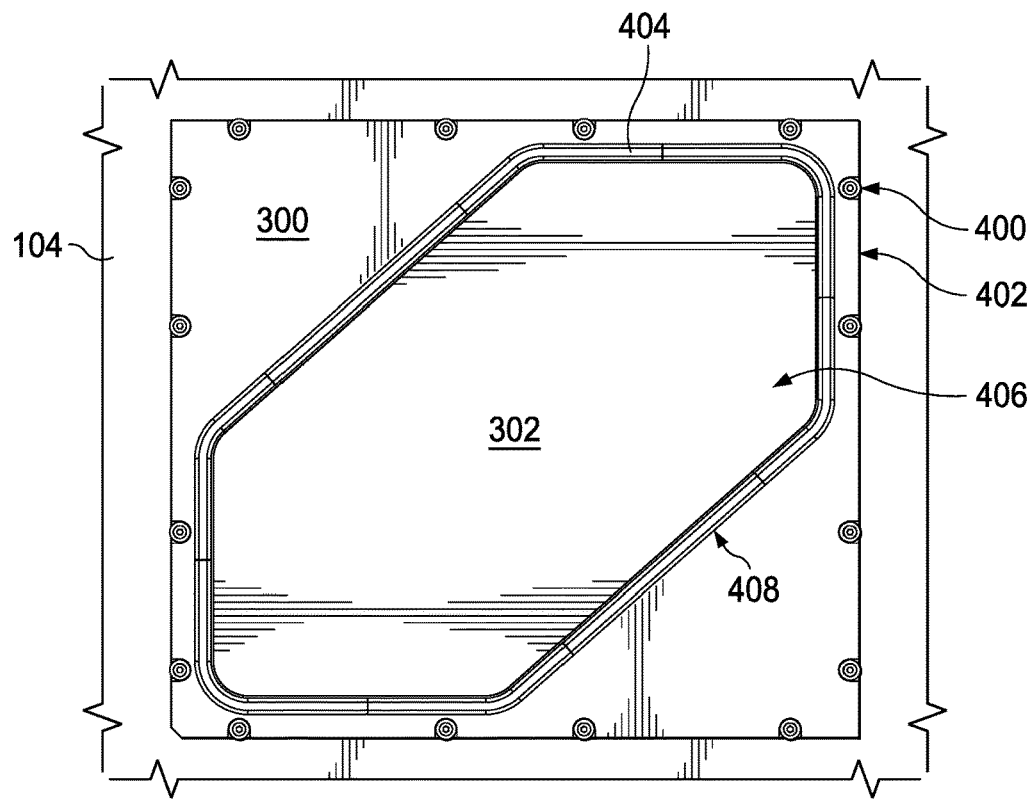
FIG. 4 is an illustration of an upper portion of a press in accordance with an illustrative embodiment.

Turning now to FIG. 4, an illustration an upper portion of a press is depicted in accordance with an illustrative embodiment. FIG. 4 also illustrates an example of physical implementations of components within composite manufacturing system 202 shown in block form in FIG. 2. FIG. 4 shows upper portion 104 of press 102 looking directly upward.

As illustrated, frame 300 is secured to upper portion 104 of press 102 using fasteners 400 about perimeter 402 of frame 300. Frame 300 has ridge 404 and hollow center 406.

Bladder 302 is shown in hollow center 406 of frame 300. Bladder 302 is shown in its original state in this illustrative example. In other words, bladder 302 is not a reusable bladder previously formed through the processes described herein.

Hollow center 406 has shape 408. Shape 408 is selected such that bladder 302 covers the entirety of composite material 112 and tool 110.

Figure 5:
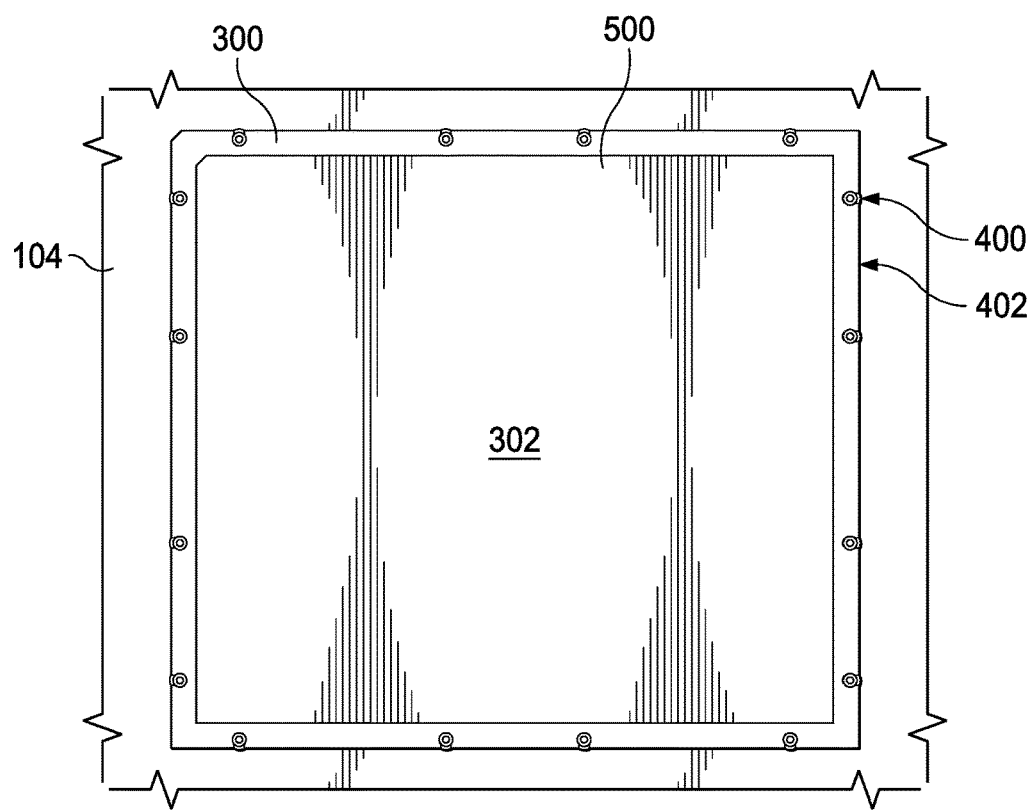
FIG. 5 is another illustration of an upper portion of a press in accordance with an illustrative embodiment.

Turning next to FIG. 5, another illustration of an upper portion of a press is depicted in accordance with an illustrative embodiment. In this illustrative example, upper portion 104 of press 102 is shown in phantom. FIG. 5 shows upper portion 104 of press 102 looking directly downward from above.

In this illustrative example, bladder 302 takes the form of sheet 500. As seen in this view, sheet 500 has a square shape that drapes over hollow center 406 shown in FIG. 4. The perimeter of sheet 500 interfaces with the perimeter of frame 300.

Figure 6:
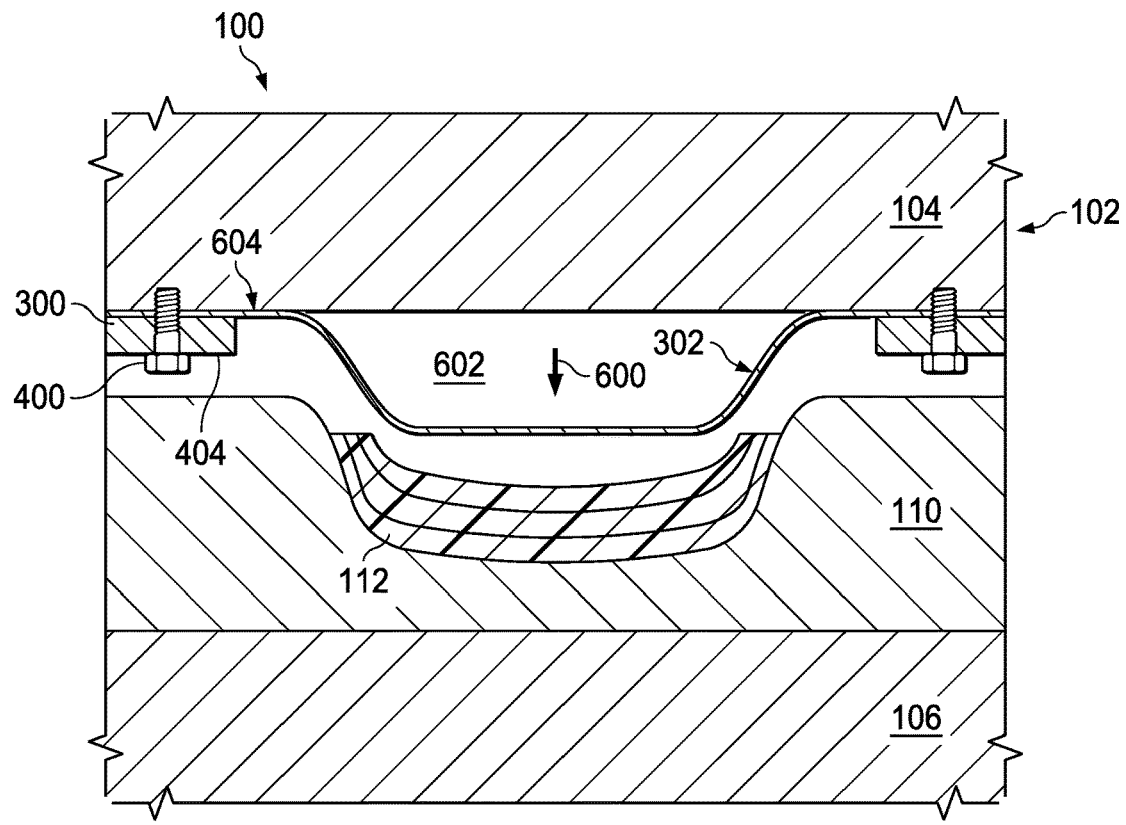
FIG. 6 is an illustration of a cross-sectional view of a press in accordance with an illustrative embodiment.
Figure 7:
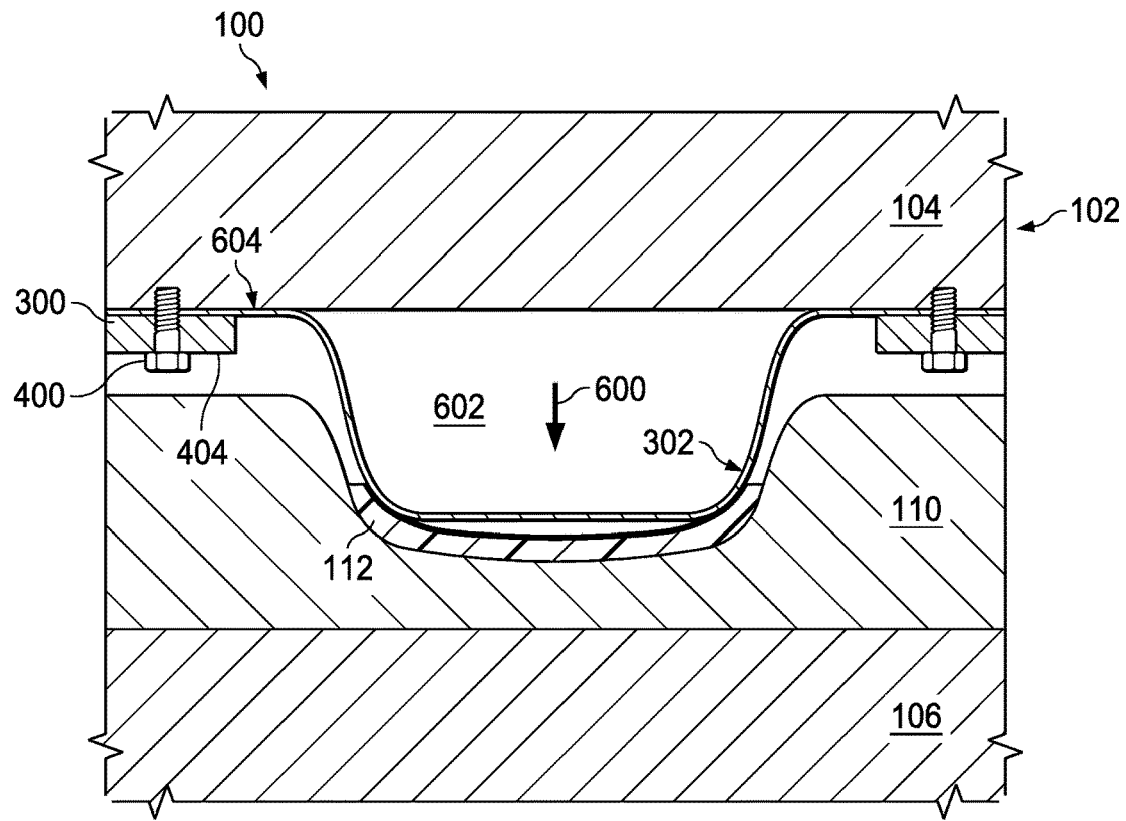
FIG. 7 is another illustration of a cross-sectional view of a press in accordance with an illustrative embodiment.
Figure 8:
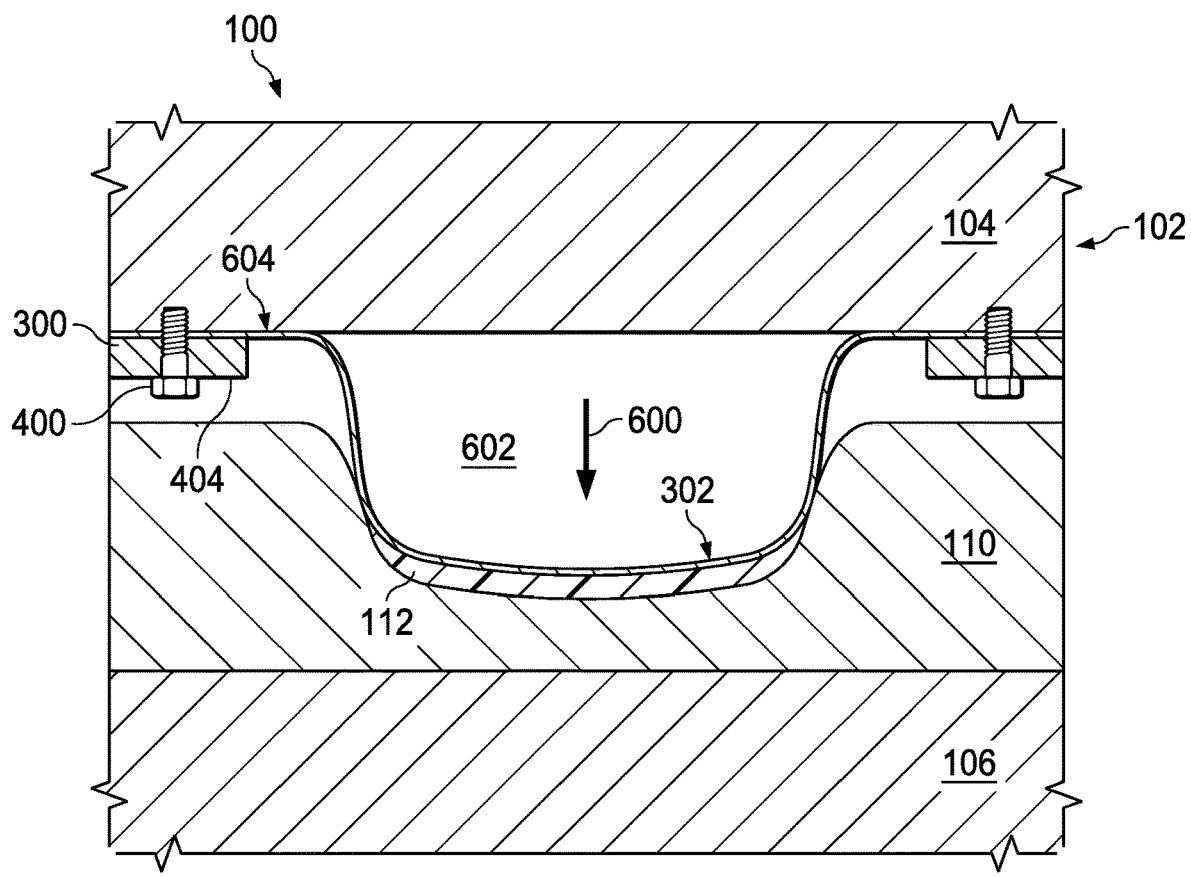
FIG. 8 is yet another illustration of a cross-sectional view of a press in accordance with an illustrative embodiment.

FIGS. 6-8 are illustrations of cross-sectional views of a press in accordance with an illustrative embodiment. A cross-sectional view of press 102 is shown along lines 6-6 in FIG. 3. Press 102 has been closed in this illustrative example.

FIG. 6 shows press 102 shortly after closing. Press 102 has not yet been heated. Gas blows in the direction of arrows 600 in space 602 between upper portion 104 of press 102 and the back side of bladder 302. Gas is used to push bladder 302 closer toward composite material 112. Ridge 404 of frame 300 and bladder 302 make near air-tight seal 604.

In FIG. 7, space 602 has been pressurized to a first level. That first level of pressure may be, for example, without limitation, 10-30 PSI.

The components within press 102 have also been heated. For example, without limitation, tool 110, bladder 302, and composite material 112 have been heated to about 700 degrees Fahrenheit. The pressure remains at the first level during the heating phase. At this temperature, bladder 302 begins to superplastically form over composite material 112 on tool 110. Once bladder 302 makes contact with composite material 112, the pressure on bladder 302 transfers to composite material 112. Composite material 112 is beginning to take a desired shape. Bladder 302 transfers heat to composite material 112 during this process as well. The entire system may be heated to about 800 degrees Fahrenheit in this illustrative example.

FIG. 8 shows the components in press 102 at the beginning of the cooling stage. Space 602 has been pressurized to a second level during the final stages of heating. For example, without limitation, the second level of pressure may be between 130-210 psi.

Now, the second level of pressure is maintained while composite material 112 cools. Composite material 112 has a desired shape for the composite structure. Depending on the particular implementation, the components within press 102 are cooled to a temperature below the crystallization temperature of the composite structure. Pressure is released and press 102 is opened.

Figure 9:
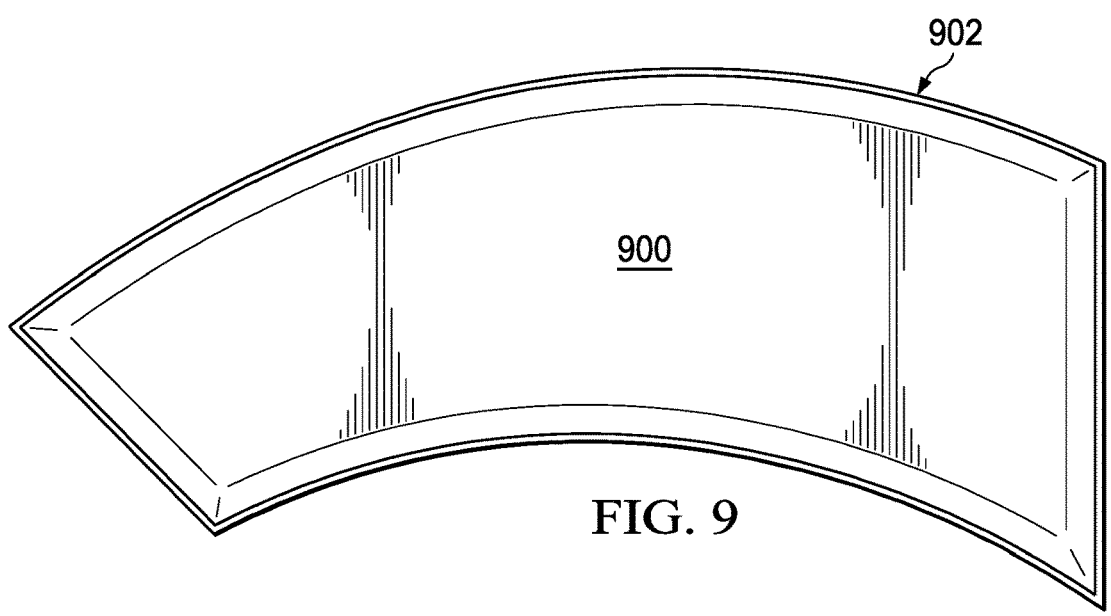
FIG. 9 is an illustration of a composite structure formed in accordance with an illustrative embodiment.

Turning next to FIG. 9, an illustration of composite structure is depicted in accordance with an illustrative embodiment. Composite structure 900 was formed using the processes described in FIGS. 6-8. Composite structure 900 has shape 902.

Figure 10:
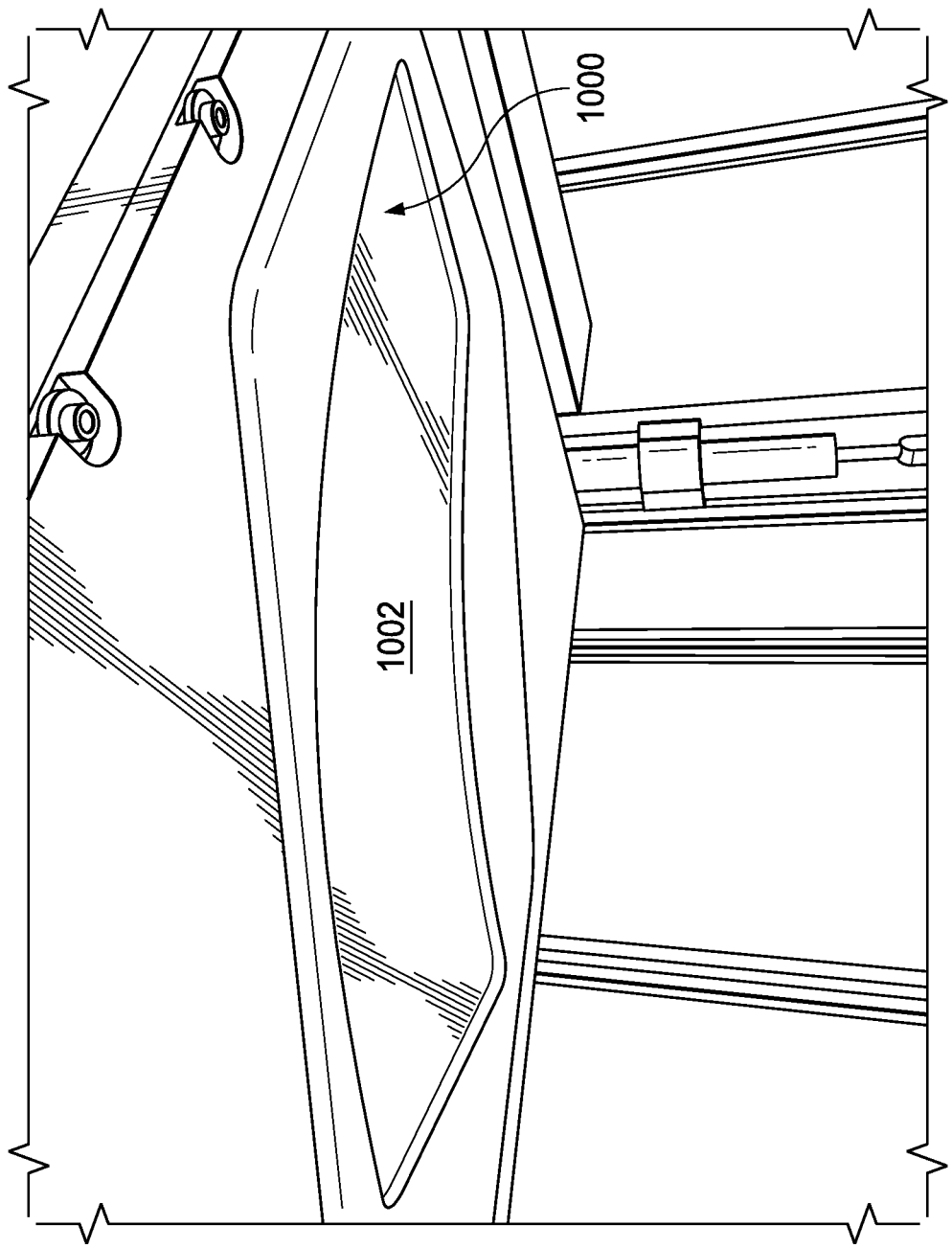
FIG. 10 is an illustration of a bladder in accordance with an illustrative embodiment.

With reference to FIG. 10, an illustration of a bladder is depicted in accordance with an illustrative embodiment. FIG. 10 shows bladder 302 after formation of composite structure 900 from FIG. 9. Shape 1000 of bladder 302 corresponds to shape 902 of composite structure 900. Bladder 302 now takes the form of reusable bladder 1002. To form another structure, more composite material is placed over tool 110 and the process described in FIGS. 6-8 is repeated.

The different components shown in FIG. 1 and FIGS. 3-10 may be combined with components in FIG. 2, used with components in FIG. 2, or a combination of the two. Additionally, some of the components in FIG. 1 and FIGS. 3-10 may be illustrative examples of how components shown in block form in FIG. 2 may be implemented as physical structures.

Other configurations for composite manufacturing system 100 may be implemented other than those shown in FIG. 1 and FIGS. 3-6. For instance, although not shown in FIGS. 3-10, the illustrative embodiments can be used to manufacture structures with ply drops at any portion on the structure. For example, bladder 302 functions in the same manner as described herein to apply heat and pressure to a composite structure with ply drops in the center of the structure, toward the outside edges of the structure, or in some other manner. As a result, the illustrative embodiments accommodate various part geometries.

Further, although the process is completed by pressurizing the space between the upper portion of the press and a magnesium sheet, other illustrative examples may use a traditional bladder. In such a scenario, the bladder itself would be inflated to provide the desired level of pressure to form the composite structure.

In other illustrative examples, multiple bladders may be used to form multiple structures during one press cycle. In still other illustrative examples, one bladder may be used to form more than one structure during a single cycle.

Figure 11:
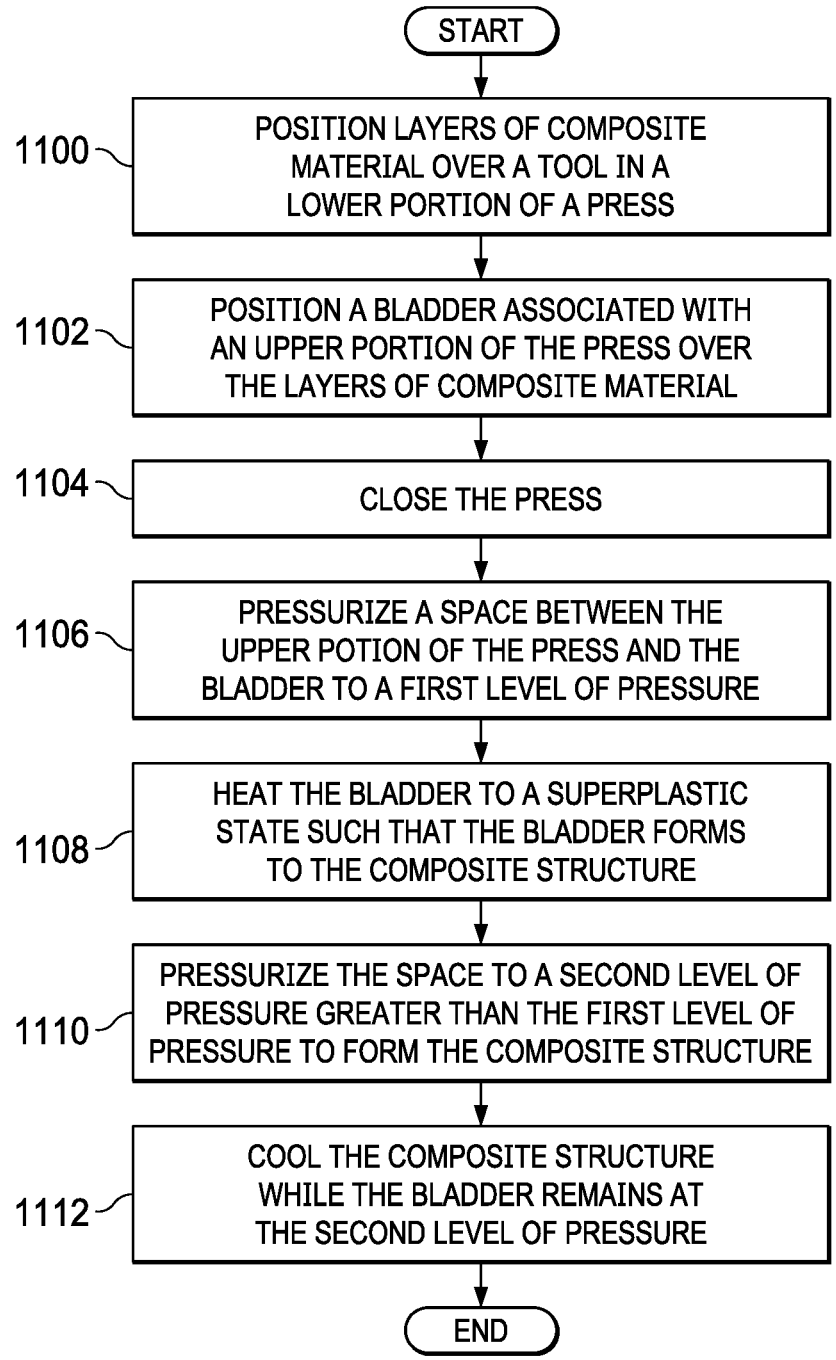
FIG. 11 is an illustration of a flowchart of a process for forming a composite structure in accordance with an illustrative embodiment.

With reference next to FIG. 11, an illustration of a flowchart of a process for forming a composite structure is depicted in accordance with an illustrative embodiment. The method depicted in FIG. 11 may be used with composite manufacturing system 202 to form composite structure 204 using bladder 212 in FIG. 2.

The process begins by positioning layers of composite material over a tool in a lower portion of a press (operation 1100). Next, the process positions a bladder associated with an upper portion of the press over the layers of composite material (operation 1102). The bladder is secured to the upper portion of the press using a frame configured to apply pressure around a portion of the bladder to create a substantially air-tight seal. The press is closed (operation 1104).

The process then pressurizes a space between the upper portion of the press and the bladder to a first level of pressure (operation 1106). The space is pressurized by supplying gas to the space between the upper portion of the press and the bladder. As a result, the bladder applies pressure to the layers of composite material. Next, the bladder is heated to a superplastic state such that the bladder forms to the composite structure (operation 1108).

After the bladder reaches its superplastic state, the process then pressurizes the space to a second level of pressure greater than the first level of pressure to form the composite structure (operation 1110). The composite structure is then cooled while the bladder remains at the second level of pressure (operation 1112), with the process terminating thereafter.

Figure 12:
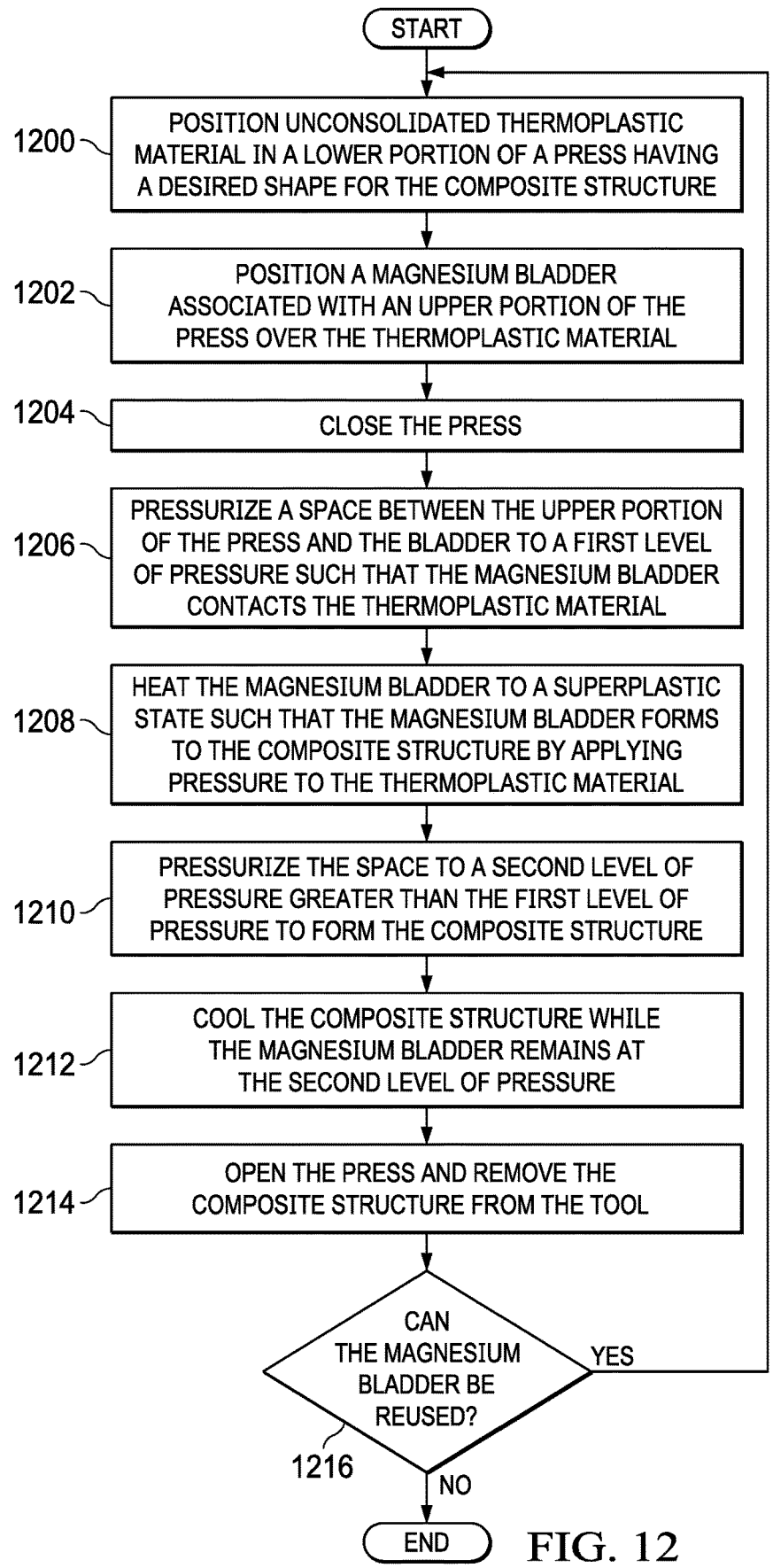
FIG. 12 is an illustration of a flowchart of a process for consolidating and forming a composite structure for an aircraft in accordance with an illustrative embodiment.

Turning now to FIG. 12, an illustration of a flowchart of a process for consolidating and forming a composite structure for an aircraft is depicted in accordance with an illustrative embodiment. The method depicted in FIG. 12 also may be used with composite manufacturing system 202 to form composite structure 204 using bladder 212 in FIG. 2.

The process begins by positioning unconsolidated thermoplastic material in a lower portion of a press having a desired shape for the composite structure (operation 1200). Next, the process positions a magnesium bladder associated with an upper portion of the press over the thermoplastic material (operation 1202). The press is closed (operation 1204).

Thereafter, the process pressurizes a space between the upper portion of the press and the magnesium bladder to a first level of pressure such that the magnesium bladder contacts the thermoplastic material (operation 1206). The process then heats the magnesium bladder to a superplastic state such that the magnesium bladder forms to the composite structure by applying pressure to the thermoplastic material (operation 1208).

The process next pressurizes the space to a second level of pressure greater than the first level of pressure to form the composite structure (operation 1210). The composite structure is cooled while the magnesium bladder remains at the second level of pressure (operation 1212).

The press is opened, and the composite structure is removed from the tool (operation 1214). The process then determines whether the magnesium bladder can be reused (operation 1216). If the magnesium bladder can be reused, the process returns to operation 1200 for another cycle to form a second composite structure using the magnesium bladder. If the magnesium bladder cannot be used, the process terminates, or a new magnesium sheet is secured to the frame to fabricate the second composite structure.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 13:
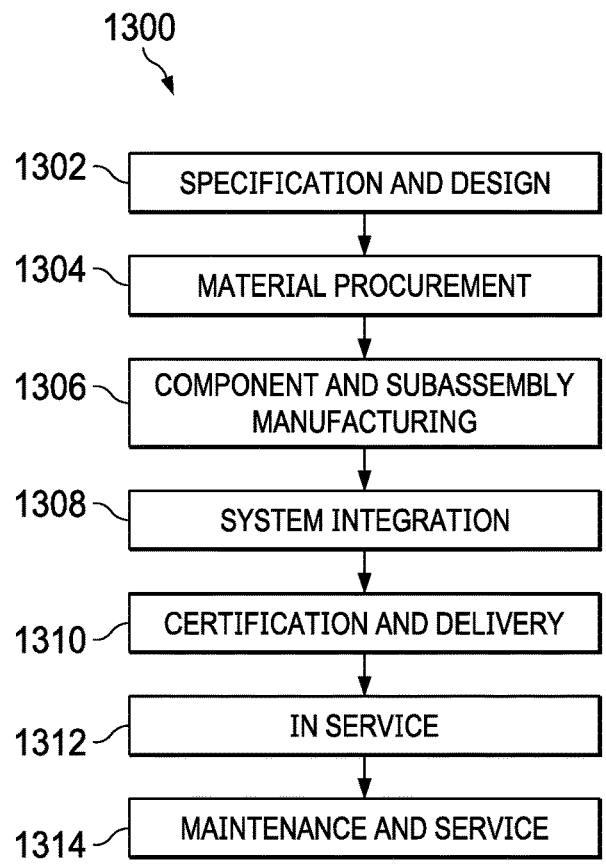
FIG. 13 is an illustration of a block diagram of an aircraft manufacturing and service method in accordance with an illustrative embodiment.
Figure 14:
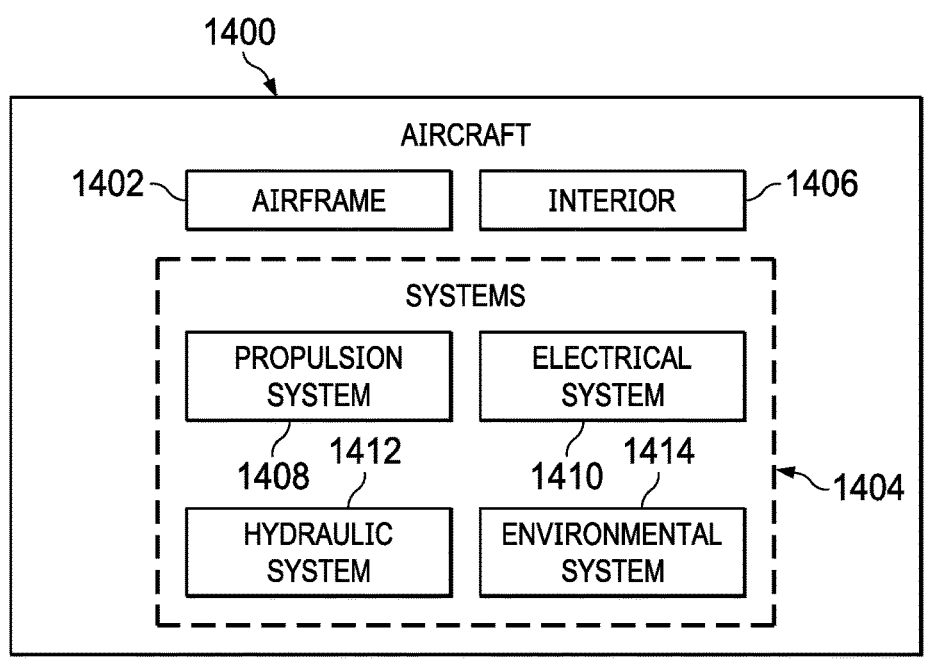
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Composite structure 204 from FIG. 2 may be made using composite manufacturing system 202 with bladder 212 during component and subassembly manufacturing 1306. In addition, components within composite manufacturing system 202 may be used during routine maintenance and service 1314 as part of a modification, reconfiguration, or refurbishment of aircraft 1400 in FIG. 14.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 14, an illustration of a block diagram of an aircraft is depicted in which a composite structure made using an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

With the use of an illustrative embodiment, a composite manufacturing system can work more efficiently with shorter cycle times. Compression molding of thermoplastics can be completed four times faster than with currently used systems. Since the illustrative embodiments are configured to consolidate and form thermoplastics during the same cycle, fewer processes are needed. As a result, the thermoplastic material can go from loose plies to a net shape part.

The illustrative embodiments use materials that are much less expensive that traditional matched metal tooling. Since only one side of the press requires expensive tooling, cost savings are realized. In addition, when tolerances allow, the bladder may be used to make more than one structure, creating further savings.

The illustrative embodiments also provide precision compression molding when ply drops are present in the composite structure. As a result, the illustrative embodiments can provide single-sided tooling for complex geometries of composites.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite manufacturing system comprising:
   a press comprising:
      an upper portion; and
      a lower portion having a desired shape for a composite structure, wherein the lower portion is configured to receive layers of composite material;
   a bladder associated with the upper portion of the press and configured to reach a superplastic state when heated such that the bladder while in the superplastic state contacts the composite material and forms the composite structure by applying pressure to the layers of composite material, wherein the bladder comprises magnesium configured to reach the superplastic state between 600 and 800 degrees Fahrenheit; and
   a frame fastened to the upper portion, wherein the bladder is positioned between the frame and the upper portion and the frame is configured to hold the bladder in place during formation of the composite structure.

2. The composite manufacturing system of claim 1, wherein the bladder is configured to transfer heat to the layers of composite material.

3. The composite manufacturing system of claim 2, wherein the bladder is a reusable bladder.

4. The composite manufacturing system of claim 2, wherein the layers of composite material comprise ply drops.

5. The composite manufacturing system of claim 1 further comprising:
   a space between the upper portion and the bladder, wherein pressurized air supplied to the space is configured to separate a portion of the bladder from the upper portion and push the portion of the bladder through the frame against the composite material.

6. The composite manufacturing system of claim 1, further comprising:
   the frame having a ridge configured to apply pressure around a portion of the bladder to create a substantially air-tight seal between the upper portion and the bladder and to hold the bladder in place; and
   a hollow center in the frame, wherein the ridge runs around a perimeter of the hollow center and corresponds to the portion of the bladder.

7. A method for forming a composite structure, the method comprising:
   positioning layers of composite material over a tool in a lower portion of a press, wherein the tool has a desired shape of the composite structure;
   positioning a bladder associated with an upper portion of the press over the layers of composite material, wherein a frame is fastened to the upper portion of the press and wherein the bladder is positioned between the frame and the upper portion of the press and the frame is configured to hold the bladder in place during formation of the composite structure;
   closing the press;
   pressurizing a space between the upper portion of the press and the bladder to a first level of pressure such that the bladder contacts the layers of composite material;
   heating the bladder to a superplastic state such that the bladder while in the superplastic state contacts the composite material and forms to the composite structure by applying pressure to the composite material, wherein the bladder comprises magnesium configured to reach the superplastic state between 600 and 800 degrees Fahrenheit; and
   pressurizing the space to a second level of pressure greater than the first level of pressure to form the composite structure.

8. The method of claim 7 further comprising:
   cooling the composite structure while the bladder remains at the second level of pressure.

9. The method of claim 8, wherein the composite structure is a first composite structure and further comprising:
   reusing the bladder to form a second composite structure with the desired shape.

10. The method of claim 8 further comprising:
    consolidating the layers of composite material at substantially the same time as the composite structure is formed.

11. The method of claim 7, wherein pressurizing the space between the upper portion of the press and the bladder comprises:

supplying gas to the space between the upper portion of the press and the bladder to apply pressure to the layers of composite material.

12. The method of claim 7 further comprising:
securing the bladder to the upper portion of the press using the frame which is configured to create an air-tight seal between the bladder and the upper portion of the press.

13. A method for forming a composite structure for an aircraft, the method comprising:
positioning thermoplastic material in a lower portion of a press having a desired shape for the composite structure;
positioning a bladder associated with an upper portion of the press over the thermoplastic material, wherein a frame is fastened to the upper portion of the press and wherein the bladder is positioned between the frame and the upper portion of the press and the frame is configured to hold the bladder in place during formation of the composite structure;
closing the press;
pressurizing a space between the upper portion of the press and the bladder to a first level of pressure;
heating the bladder to a superplastic state such that the bladder while in the superplastic state contacts the thermoplastic material and forms to the composite structure by applying pressure to the thermoplastic material, wherein the bladder comprises magnesium configured to reach the superplastic state between 600 and 800 degrees Fahrenheit; and
pressurizing the space to a second level of pressure greater than the first level of pressure to form the composite structure.

14. The method of claim 13 further comprising:
cooling the composite structure while the bladder remains at the second level of pressure.

15. The method of claim 13 further comprising:
securing the bladder to the upper portion of the press using the frame.

16. The method of claim 13, wherein the thermoplastic material comprises ply drops.

17. The method of claim 13, wherein the bladder is a reusable bladder.

18. The composite manufacturing system of claim 1 further comprising:
a gas supply system integrated into the press and configured to pressurize the bladder.

19. The composite manufacturing system of claim 1 further comprising:
a heating mechanism integrated into the press and configured to heat the bladder.

20. The composite manufacturing system of claim 19, wherein the heating mechanism is a heat source selected from at least one of a resistive heater, heated oil, heated steam, heated compressed air, and inductive heating and wherein the heating mechanism provides a level of heat sufficient to form the composite structure.

* * * * *